US012613616B2

(12) United States Patent
Nie et al.

(10) Patent No.: US 12,613,616 B2
(45) Date of Patent: Apr. 28, 2026

(54) INFORMATION DISPLAY METHOD, DEVICE, COMPUTER APPARATUS AND STORAGE MEDIUM

(71) Applicant: Beijing Zitiao Network Technology Co., Ltd., Beijing (CN)

(72) Inventors: Huijing Nie, Beijing (CN); Le Wang, Beijing (CN); Dongling Gao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 205 days.

(21) Appl. No.: 18/523,829

(22) Filed: Nov. 29, 2023

(65) Prior Publication Data

US 2024/0220084 A1 Jul. 4, 2024

(30) Foreign Application Priority Data

Dec. 30, 2022 (CN) .......................... 202211732141.3

(51) Int. Cl.
*G06F 3/0483* (2013.01)
*G06F 3/04842* (2022.01)
(Continued)

(52) U.S. Cl.
CPC .......... *G06F 3/0483* (2013.01); *G06F 16/285* (2019.01); *G06F 40/166* (2020.01); *G06F 3/04842* (2013.01)

(58) Field of Classification Search
CPC .. G06F 3/0483; G06F 3/04842; G06F 16/285; G06F 40/166
See application file for complete search history.

(56) References Cited

U.S. PATENT DOCUMENTS 8,478,662 B1 * 7/2013 Snodgrass ............. G06F 16/335
705/26.7
9,116,654 B1 * 8/2015 Shah ....................... G06F 3/147
(Continued)

FOREIGN PATENT DOCUMENTS

CN 109918487 A 6/2019
CN 113220774 A 8/2021
(Continued)

OTHER PUBLICATIONS

Office action received from Chinese patent application No. 202211732141.3 mailed on Mar. 14, 2025, 16 pages (8 pages English Translation and 8 pages Original Copy).
(Continued)

*Primary Examiner* — Daniel Samwel
(74) *Attorney, Agent, or Firm* — Faegre Drinker Biddle & Reath LLP

(57) ABSTRACT

The present disclosure provides an information display method, device, computer apparatus and storage medium, wherein the method comprises: receiving an access request for book encyclopedia information of a target book; acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original innovative information and/or information obtained by automatically identifying book-related content of the target book; acquiring and displaying a book encyclopedia page matching book category of the target book, and displaying the book encyclopedia information of each information module in the book encyclopedia page.

19 Claims, 4 Drawing Sheets

(51) Int. Cl.
    *G06F 16/28*      (2019.01)
    *G06F 40/166*     (2020.01)

(56)                    References Cited

U.S. PATENT DOCUMENTS

| | | | | |
|---|---|---|---|---|
| 10,178,059 B1 * | 1/2019 | Garg | ....................... | H04L 51/08 |
| 2007/0055926 A1 * | 3/2007 | Christiansen | .......... | G06Q 10/10 |
| | | | | 715/244 |
| 2010/0114908 A1 * | 5/2010 | Chand | ................... | G06F 16/951 |
| | | | | 707/E17.014 |
| 2012/0173659 A1 * | 7/2012 | Thaxter | ............... | G06F 3/04817 |
| | | | | 709/217 |
| 2012/0200573 A1 * | 8/2012 | Stoner | ..................... | G09B 5/02 |
| | | | | 345/472 |
| 2016/0188558 A1 * | 6/2016 | Shikawa | ............... | G06F 40/103 |
| | | | | 715/230 |
| 2019/0361543 A1 * | 11/2019 | Zhang | ................... | G06F 1/1684 |

FOREIGN PATENT DOCUMENTS

| | | | |
|---|---|---|---|
| CN | 113609286 A | 11/2021 |
| CN | 113961794 A | 1/2022 |
| CN | 113971214 A | 1/2022 |
| CN | 115328361 A | 11/2022 |
| WO | 2022/111249 A1 | 6/2022 |

OTHER PUBLICATIONS

First Office Action for Chinese Application No. 202211732141.3 , mailed Oct. 31, 2024, 15 Pages.

* cited by examiner

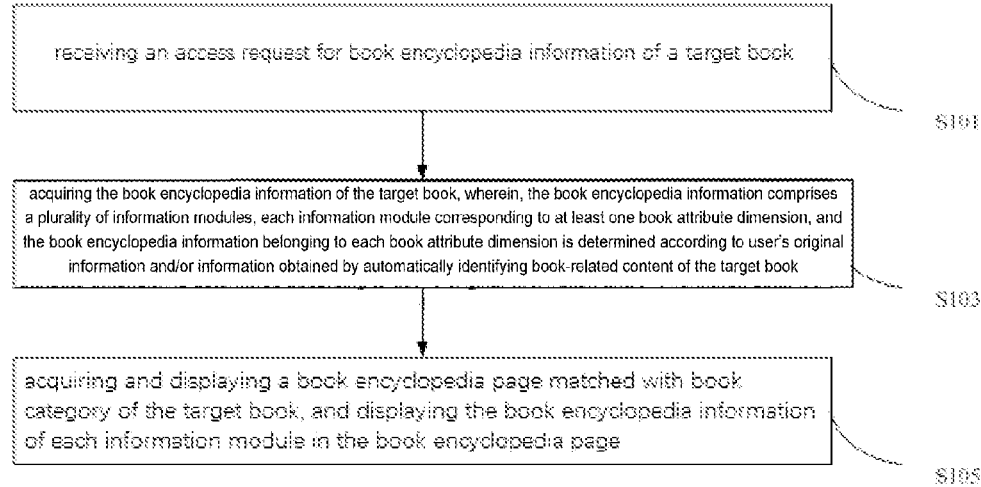

receiving an access request for book encyclopedia information of a target book

S101 acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original information and/or information obtained by automatically identifying book-related content of the target book

S103 acquiring and displaying a book encyclopedia page matched with book category of the target book, and displaying the book encyclopedia information of each information module in the book encyclopedia page

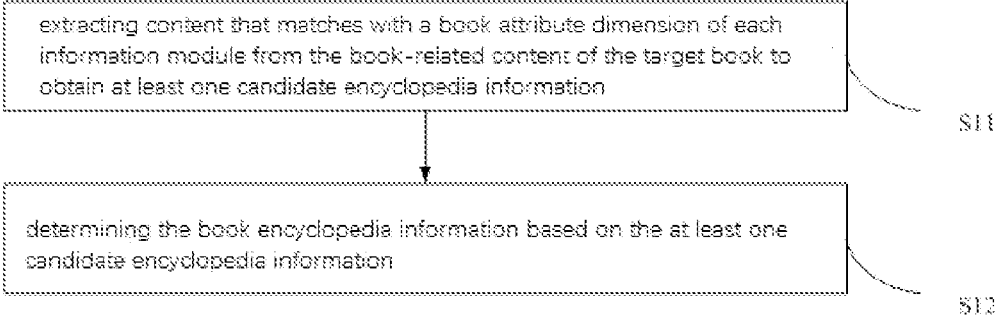

extracting content that matches with a book attribute dimension of each information module from the book-related content of the target book to obtain at least one candidate encyclopedia information

S11 determining the book encyclopedia information based on the at least one candidate encyclopedia information

S12

Fig. 2 book encyclopedia page

| introduction of works | author   world outlook   major characters   directory | introduction of works                                        comments book encyclopedia information author                                              34 comments book encyclopedia information world outlook                                         6 commnets book encyclopedia information

Fig. 3 receiving unit 10 acquring unit 20 display unit 30

INFORMATION DISPLAY METHOD, DEVICE, COMPUTER APPARATUS AND STORAGE MEDIUM

CROSS REFERENCE TO RELATED APPLICATIONS

This application claims the benefit of priority to Chinese Application No. 202211732141.3, filed on Dec. 30, 2022, the entire contents of which are incorporated herein by reference.

TECHNICAL FIELD

The present disclosure relates to the technical field of computer, and in particular, to an information display method, device, computer apparatus and storage medium.

BACKGROUND ART

With rapid development of online reading applications, the number of books that a user can read in online reading applications is also increasing gradually. Therefore, the user needs to screen out the books he/she wants to read from many books. Before the user chooses a book he/she wants to read, he/she usually gets to know the book through the book preface. If the book preface is relatively simple or complicated, the user cannot quickly and intuitively understand the contents of the book through the book preface, and he/she cannot accurately screen out the book he/she wants to read, which reduces the user's experience when using the online reading application.

SUMMARY OF THE INVENTION

Embodiments of the present disclosure at least provide an information display method, device, computer apparatus and storage medium.

On one aspect, the embodiment of the present disclosure provides an information display method, comprising: receiving an access request for book encyclopedia information of a target book; acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original innovative information and/or information obtained by automatically identifying book-related content of the target book; acquiring and displaying a book encyclopedia page matched with book category of the target book, and displaying the book encyclopedia information belonging to each information module in the book encyclopedia page.

In an alternative embodiment, the encyclopedia information of the book is determined by: extracting the content that matches with the book attribute dimension of each information module from the book-related content of the target book to obtain at least one candidate encyclopedia information; determining the book encyclopedia information based on the at least one candidate encyclopedia information.

In an alternative embodiment, the determining the book encyclopedia information based on the at least one candidate encyclopedia information, comprises: determining a selected target candidate encyclopedia information in response to a selection operation of the at least one candidate encyclopedia information, and displaying the target candidate encyclopedia information; determining an edited target candidate encyclopedia information in response to an editing operation of the target candidate encyclopedia information, and determining the book encyclopedia information based on the edited target candidate encyclopedia information.

In an alternative embodiment, the displaying the book encyclopedia information belonging to each information module in the book encyclopedia page, comprises: displaying a function tag of a target information module in the plurality of information modules in a directory display area of the book encyclopedia page, wherein the target information module is at least part of the plurality of information modules; displaying the book encyclopedia information of the target information module in a content display area of the book encyclopedia page, wherein the content display area is located below the directory display area.

In an alternative embodiment, the method further comprises: displaying a comment tag of the information module on the book encyclopedia page; in response to a triggering operation of the comment tag, displaying a target comment page and displaying target comment information on the target comment page, wherein, the target comment information includes at least one of the following: historical comment information of the information module, comment interaction information of the historical comment information, a comment input box.

In an alternative embodiment, the method further comprises: displaying a contribution tag of the information module on the book encyclopedia page; displaying a target contribution page in response to a triggering operation of the contribution tag; acquiring contribution information of the information module, in response to an editing operation of the contribution input box in the target contribution page, so as to update book encyclopedia information of the corresponding information module according to the contribution information.

In an alternative embodiment, the function tag includes at least one directory tag and a switch tag, wherein each information module corresponds to one directory tag, and the switch tag is a tag for switching information modules displayed in the content display area; after displaying the functional tag of the target information module of the plurality of target information modules in the directory display area of the book encyclopedia page, the method further comprises: displaying a directory intermediate page in response to a trigger operation of the switch tag, wherein, the directory intermediate page comprises a directory tag corresponding to each said information module and at least one sub-tag of each said directory tag; in response to a trigger operation of a first tag in the directory intermediate page, jumping to displaying the book encyclopedia page, and displaying book encyclopedia information corresponding to the first tag in the content display area of the book encyclopedia page, wherein the first tag comprises a directory tag or a sub-tag of the directory tag.

In an alternative embodiment, the method further comprises: displaying a functional new page in response to a new operation of the information module, wherein the functional new page includes at least one alternative function; in response to a triggering operation on a target alternative function in the at least one alternative function, creating an editing area of the target alternative function in the book encyclopedia page; determining book encyclopedia information of the target alternative function based on editing information of the editing area. On a second aspect, the embodiment of the present disclosure provides an information display device, comprising: a receiving unit for receiving an access request for book encyclopedia information of a target book; an acquiring unit for acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original innovative information and/or information obtained by automatically identifying book-related content of the target book; a display unit for acquiring and displaying a book encyclopedia page matched with book category of the target book, and displaying the book encyclopedia information belonging to each information module in the book encyclopedia page.

On a third aspect, an embodiment of the present disclosure further provides a computer apparatus including a processor, a memory and a bus, wherein the memory is configured to store a machine-readable instruction executable by the processor, wherein, when the computer apparatus operates, the processor communicates with the memory through the bus, and wherein, when the machine-readable instruction is executed by the processor, steps in the first aspect or any possible embodiment of the first aspect are executed.

On a fourth aspect, an embodiment of the present disclosure further provides a computer-readable storage medium, on which a computer program is stored, and the computer program, when executed by the processor, steps in the first aspect, or any possible embodiment of the first aspect are executed.

In the embodiment of the present disclosure, firstly, an access request for book encyclopedia information of a target book is received, and then, the book encyclopedia information of the target book can be acquired, wherein the book encyclopedia information comprises a plurality of information modules, each information module corresponding to at least one book attribute dimension. Here, the book encyclopedia information belonging to each book attribute dimension can be determined according to the user's original innovative information, and can also be determined according to information obtained by automatically identifying the book-related content of the target book. After acquiring the book encyclopedia information, the book encyclopedia information can be displayed in the book encyclopedia page matching book category of the target book.

In order to make the above objects, features and advantages of the present disclosure more obvious and easy to understand, a detailed description of preferred embodiments a given below, with reference to the attached drawings.

BRIEF DESCRIPTION OF THE DRAWINGS

In order to explain the technical solutions of the embodiments of the present disclosure more clearly, a brief introduction to drawings needed in the embodiments is given below, which drawings are incorporated into and constitute part of the description. These drawings show the embodiments in line with the present disclosure and serve to explain the technical solutions of the present disclosure, together with the description. It should be understood that the below drawings illustrate only some embodiments of the present disclosure and therefore should not be considered as limiting the scope of the disclosure. Those skilled in the art can obtain further related drawings according to these drawings without any creative effort.

FIG. 1 shows a flowchart of an information display method provided by an embodiment of the present disclosure;

FIG. 2 shows a flowchart of a specific method for determining the book encyclopedia information in the information display method provided by the embodiment of the present disclosure;

FIG. 3 is a schematic diagram of a book encyclopedia page provided by an embodiment of the present disclosure;

DETAILED DESCRIPTION OF PREFERRED EMBODIMENTS

Figures 4, 5:
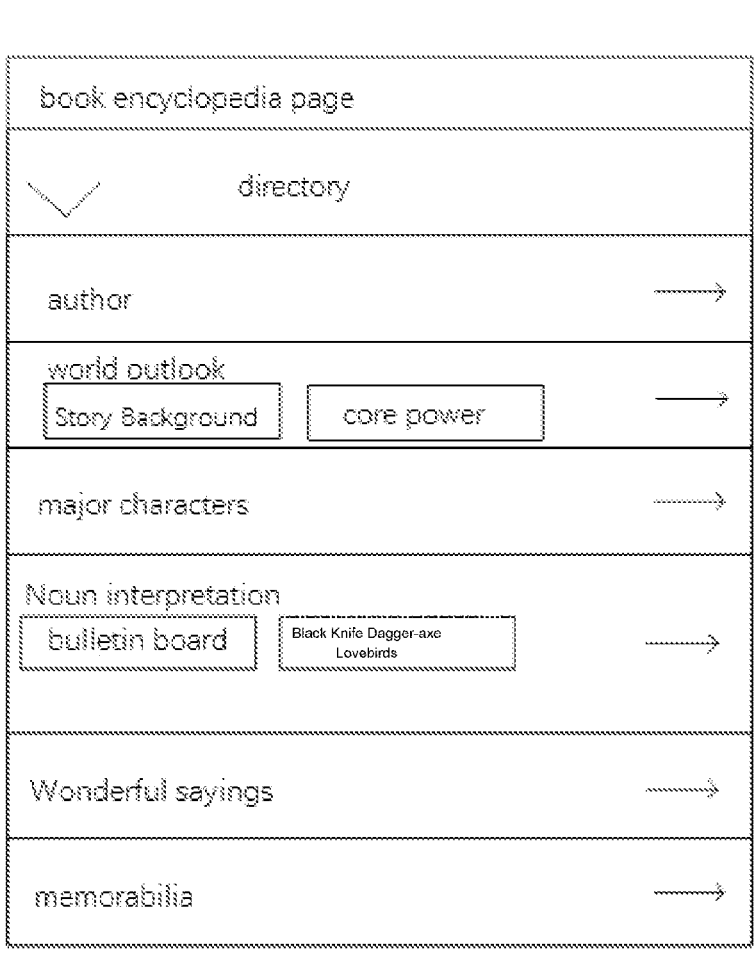
FIG. 4 is a schematic diagram of a directory intermediate page provided by an embodiment of the present disclosure.
FIG. 5 is a schematic diagram of an information display device provided by an embodiment of the present disclosure.

In order to make the objectives, technical solutions and advantages of the embodiments of the present disclosure more clear, with reference to the drawings of the embodiments of the present disclosure, a clear and complete description is given below for the technical solutions of the embodiments of the present disclosure. Obviously, the embodiments described below are only part of the embodiments, rather than all of the embodiments. Components of the embodiments of the present disclosure generally described and illustrated in the drawings herein may be arranged and designed in various different configurations. Therefore, the following detailed description of the embodiments of the disclosure provided in the accompanying drawings is not intended to limit the scope of the claimed disclosure, but merely represents selected embodiments of the present disclosure. All the other embodiments that can be obtained by a person skilled in the art based on the embodiments of the present disclosure without any creative effort are included in the protection scope of the present disclosure.

It should be noted that, as like reference signs in the below drawings denote like elements, once an element is defined in a figure, it does not need to make further definition and explanation for it in a subsequent drawing.

In this context, the term "and/or" only describes an associative relationship, which means that there can be three kinds of relationships, for example, A and/or B, which can mean that A exists alone, A and B exist at the same time, and B exists alone. Besides, in this context, the term "at least one" means any one or any combination of at least two of a variety, for example, including at least one of A, B and C can represent including any one or more elements selected from the group consisting of A, B and C.

It is found through research that, with rapid development of online reading applications, the number of books that a user can read in online reading applications is also increasing gradually. Therefore, the user needs to screen out the books he/she wants to read from many books. Before the user chooses a book he/she wants to read, he/she usually gets to know the book through the book preface. If the book preface is relatively simple or complicated, the user cannot quickly and intuitively understand the contents of the book through the book preface, and he/she cannot accurately screen out the book he/she wants to read, which reduces the user's experience when using the online reading application. Based on the above research, the present disclosure provides an information display method, device, computer apparatus and storage medium. In the embodiment of the present disclosure, firstly, an access request for book encyclopedia information of a target book is received, and then, the book encyclopedia information of the target book can be acquired, wherein the book encyclopedia information comprises a plurality of information modules, each information module corresponding to at least one book attribute dimension. Here, the book encyclopedia information belonging to each book attribute dimension can be determined according to the user's original innovative information, and can also be determined according to information obtained by automatically identifying the book-related content of the target book. After acquiring the book encyclopedia information, the book encyclopedia information can be displayed in the book encyclopedia page matching book category of the target book.

In the above embodiment, by setting book encyclopedia information for the target book, information of each book attribute dimension to which the target book belongs can be aggregated. By displaying the book encyclopedia information of the target book through the book encyclopedia page, various book encyclopedia information of the target book can be displayed for the user through more aggregated display, such that the user can get to know the target book more quickly, thereby improving the user's screening efficiency of books and further improving the user's retrieval efficiency.

In order to facilitate the understanding of this embodiment, firstly, an information display method disclosed in the embodiment of this disclosure is introduced in detail. An executing subject of the information display method provided by the embodiment of the present disclosure is generally a computer apparatus with a certain computing power, which computer apparatus includes, for example: terminal device or server or other processing equipment, the terminal device can be user equipment (UE), mobile equipment, user terminal, terminal, cellular phone, cordless phone, Personal Digital Assistant (PDA), handheld device, computing device, vehicle-mounted device, wearable device, etc. In some possible implementations, the information display method can be implemented by a processor calling computer-readable instructions stored in a memory.

Embodiment 1

Referring to FIG. 1, it shows a flowchart of an information display method provided by an embodiment of the present disclosure, the method including steps S101~S105, wherein:

S101: receiving an access request for book encyclopedia information of a target book.

In the embodiment of the present disclosure, an encyclopedia button can be preset for the corresponding book in the client, and after a trigger operation of the encyclopedia button is detected, it is determined that the access request for the book encyclopedia information of the target book is received.

S103: acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original innovative information and/or information obtained by automatically identifying book-related content of the target book.

After receiving the access request for the book encyclopedia information, the client can send a data request to the server to request the book encyclopedia information of the target book, wherein the data request carries book information of the target book. After acquiring the data request, the server can acquire the book encyclopedia information of the target book according to the book information of the target book, and feedback the book encyclopedia information to the client.

Here, the book encyclopedia information can include a plurality of information modules, for example, it can include the following information modules: introduction of works, author profile, protagonist information, world outlook, major characters, core forces, major events, forbidden market settings, and high-light scenes.

From the above description, it can be seen that each information module in the book encyclopedia information corresponds to a book attribute dimension. For example, the book attribute dimension corresponding to the information module "Author Profile" is the book author, and the book attribute dimension corresponding to the information module "protagonist information" is the book character.

Here, each information module can include at least one information item, and the information items in the same information module correspond to the same book attribute dimension.

In the embodiment of the present disclosure, the book encyclopedia information of the target book in each book attribute dimension can be user's original innovative information, wherein the user's original innovative information can be book encyclopedia information created by at least one user for the target book; besides, the book-related content of the target book can be automatically identified, so as to identify the book encyclopedia information under the corresponding book attribute dimension, wherein the book-related content includes at least one of the following: book reviews, book-related topics, and book attribute information.

In actual implementation, the book-related content associated with the book attribute dimension can be determined according to the book attribute dimension, and the information matching the book attribute dimension can be extracted from the associated book-related content as the corresponding book encyclopedia information.

S105: acquiring and displaying a book encyclopedia page matching book category of the target book, and displaying the book encyclopedia information of each information module on the book encyclopedia page.

After acquiring the book encyclopedia information of the target book, one can also request a book encyclopedia page matching the book category of the target book from the server, and displaying the book encyclopedia information of each information module on the book encyclopedia page.

Here, different book encyclopedia pages can be preset for books of different categories, wherein types and numbers of information modules included in different book encyclopedia pages are not exactly the same, and arrangement of information modules in different book encyclopedia pages is not exactly the same. In the embodiment of the present disclosure, firstly, an access request for book encyclopedia information of a target book is received, and then, the book encyclopedia information of the target book can be acquired, wherein the book encyclopedia information comprises a plurality of information modules, each information module corresponding to at least one book attribute dimension. Here, the book encyclopedia information belonging to each book attribute dimension can be determined according to the user's originally-generated information, and can also be determined according to information obtained by automatically identifying the book-related content of the target book.

After acquiring the book encyclopedia information, the book encyclopedia information can be displayed in the book encyclopedia page matching book category of the target book.

In the above embodiment, by setting book encyclopedia information for the target book, information of each book attribute dimension to which the target book belongs can be aggregated. By displaying the book encyclopedia information of the target book through the book encyclopedia page, various book encyclopedia information of the target book can be displayed for the user through more aggregated display, such that the user can get to know the target book more quickly, thereby improving the user's screening efficiency of books and further improving the user's retrieval efficiency.

In the embodiment of the present disclosure, before the above steps S101~S105 are executed, it also needs to create the above book encyclopedia information for the target book, and the specific creation process is described as follows: Firstly, a target book for which to create encyclopedia information is determined, wherein the target book for which to create encyclopedia information can be a head book published in the client, for example, the top n books with the largest number of user votes can be taken as the head books; for a further example, the top M books that users like the most can be taken as the head books; for a furthermore example, the top P books that are read the most can be used as the head books.

After determining the target book for which encyclopedia information is to be created, book category of the target book can be identified. For example, a category tag of the target book can be determined. For example, if the category tag is fantasy, then the target book category can be determined as fantasy. Wherein, the category tag may be a tag preset for each target book. For each target book, there may be a plurality of tags. Here, said book category can be determined based on the tags with high priority among the plurality of category tags; and said book category can also be determined based on all the category tags.

After determining the book category, one can create an encyclopedia template for the target book based on the book category, wherein the encyclopedia template includes a plurality of information modules, each information module corresponding to a book attribute dimension.

In the embodiment of the present disclosure, a corresponding encyclopedia template can be created for each book category in advance, wherein types and/or numbers of modules included in the encyclopedia template created for different book categories can be different. Moreover, relationship between the book category and the encyclopedia template can be one-to-one, more-to-one, or one-to-more, that is, one book category corresponds to one encyclopedia template, or more than one book categories correspond to one encyclopedia template, or one book category corresponds to more than one encyclopedia templates, which is not specifically limited in the present technical solution.

In actual implementation, one can find the encyclopedia template matching the book category in the encyclopedia template library according to the book category of the target book. Here, if more than one encyclopedia templates are found, a prompt message can be displayed in front page to prompt the user to select one encyclopedia template among the more than one encyclopedia templates. After a user's click operation on the selected encyclopedia template is detected, a corresponding encyclopedia template can be created for the target book.

After creating the corresponding encyclopedia template for the book, one can determine the corresponding encyclopedia information for each information module in the encyclopedia template.

In an alternative embodiment, as shown in FIG. 2, the book encyclopedia information can be determined by the below method, including particularly steps of the following:

Step S11: extracting content that matches with a book attribute dimension of each information module from the book-related content to obtain at least one candidate encyclopedia information;

Step S12: determining the book encyclopedia information based on the at least one candidate encyclopedia information.

In the embodiment of the present disclosure, book-related content of the target book can be acquired, for example, one or more of book reviews, book-related topics and book attribute information of the target book can be acquired.

After acquiring the book-related content, content that matches with a book attribute dimension of each information module can be extracted from the book-related content of the target book to obtain at least one candidate encyclopedia information.

In actual implementation, the book-related content matching each information module can be determined from the book-related content of the target book. Since book attribute dimensions corresponding to different information modules are different, information content of book encyclopedia information of this information module is also different. In order to determine the book encyclopedia information of each information module more accurately, one can determine the book-related content that matches the information module from the book-related content, and then extract the content that matches the book attribute dimension of the information module from the matched book-related content as the candidate encyclopedia information.

For example, for the "Memorabilia" information module, here, the book-related content that matches the information module is book attribute information (for example, book chapter). Here, the most impressive chapter marked by the user in the target book can be determined as the content that matches the book attribute dimension of the information module. For example, the user feels that the fourth chapter is the most impressive, and then he/she can mark this chapter as a big event.

After extracting and acquiring at least one candidate encyclopedia information, the book encyclopedia information corresponding to the information module can be determined in the at least one candidate encyclopedia information.

In alternative embodiment, the step S12 of determining the book encyclopedia information based on the at least one candidate encyclopedia information, includes particularly steps of the following:

Step S121: in response to a selection operation of the at least one candidate encyclopedia information, determining the selected target candidate encyclopedia information and displaying the target candidate encyclopedia information;

Step S122: determining an edited target candidate encyclopedia information in response to an editing operation of the target candidate encyclopedia information, and determining the book encyclopedia information based on the edited target candidate encyclopedia information.

Here, it is supported that the user modifies any candidate encyclopedia information. In the embodiment of the present disclosure, after the target book is determined to create the corresponding encyclopedia template, each information module can be displayed in the encyclopedia template, and the corresponding candidate encyclopedia information can be displayed in an information display area corresponding to each information module. If the number of candidate encyclopedia information is multiple, any candidate encyclopedia information can be displayed in the information display area.

A "More" button can also be set in the encyclopedia template. After a trigger operation of the "More" button is detected, it is determined to detect the selection operation of at least one candidate encyclopedia information. Here, a floating window can be displayed in the current interface, and other candidate encyclopedia information can be displayed in the floating window. Here, the selection operation of other candidate encyclopedia information can be detected, and target candidate encyclopedia information selected by the user can be determined, and the target candidate encyclopedia information can be switched and displayed in the information display area.

After displaying the target candidate encyclopedia information, the user can edit the target candidate encyclopedia information, wherein the editing includes at least one of the following editing operations: information addition, information deletion, information replacement, etc. After the user's editing operation on the target candidate encyclopedia information is detected, the edited target candidate encyclopedia information can be determined in response to the editing operation, and book encyclopedia information corresponding to the information module can be determined based on the edited target candidate encyclopedia information.

In the above embodiment, by extracting the content matching with the book attribute dimension of each information module from the book-related content to determine the book encyclopedia information, the efficiency of determining the book encyclopedia information can be improved, thereby improving the efficiency of creating book encyclopedia information for the target book by the user. By setting the user to edit the candidate encyclopedia information, flexible configuration of the candidate encyclopedia information can be realized, thus further meeting the user's setting requirements for the book encyclopedia information.

After determining the book encyclopedia information in the manner described above, the client can obtain the book encyclopedia information sent by the server and display it.

In alternative embodiment, the step S105 of displaying the book encyclopedia information of each information module on the book encyclopedia page, includes particularly steps of the following:

Step S21: displaying a function tag of a target information module of the plurality of information modules in a directory display area of the book encyclopedia page, wherein the target information module is at least part of the plurality of information modules;

Step S22: displaying the book encyclopedia information of the target information module in a content display area of the book encyclopedia page, wherein the content display area is located below the directory display area.

In the embodiment of the present disclosure, as shown in FIG. 3, a switch tag "Directory" can be displayed in the directory display area of the book encyclopedia page in advance, wherein the switch tag can be used to jump to a position corresponding to any information module of the book encyclopedia page. After the user clicks the switch tag, a target list can be displayed, which includes a directory tag of each information module. Here, the function tag includes a switch tag and a directory tag.

Here, a corresponding directory tag can be set for each information module. For example, as shown in FIG. 3, the directory tag includes the following tags: introduction of works, author, world outlook, major characters and so on. Wherein, the directory tag can be understood as a module name of the corresponding information module.

After detecting a user's triggering operation on any directory tag, the book encyclopedia information of the information module corresponding to the directory tag can be displayed in the book encyclopedia page. For example, after the user clicks the directory tag corresponding to "world outlook", the book encyclopedia information corresponding to "world outlook" can be displayed in the directory tag.

When the directory tag comprises a large number of tags, directory tags of at least part of the information modules (i.e., target information modules) among the plurality of information modules can be displayed in the directory display area. For example, as shown in FIG. 3, the displayed directory tags are the introduction of works, author, world outlook and major characters.

After the directory tag of the target information module is displayed, the book encyclopedia information of the target information module can be displayed in the content display area of the book encyclopedia page. Here, as shown in FIG. 3, display order of the target information modules in the content display area corresponds to display order of the directory tags in the directory display area. In the above embodiment, by setting the switch tag in the directory display area, it is possible to quickly jump to display the book encyclopedia information of the corresponding information module in the content display area, thereby further improving the browsing efficiency of the user.

In an alternative embodiment, the method further comprises steps of the following:

Step S31: displaying a comment tag of the information module on the encyclopedia page;

Step S32: in response to a triggering operation of the comment tag, displaying a target comment page, and displaying target comment information on the target comment page, wherein, the target comment information includes at least one of the following: historical comment information of the information module, comment interaction information of the historical comment information, and a comment input box.

In the embodiment of the present disclosure, for each information module, a comment tag can be set in the book encyclopedia page, wherein the user can comment on the book encyclopedia information corresponding to the information module through the comment tag.

After a user's triggering operation on the comment tag is detected, a target comment page can be displayed in the book encyclopedia page, and target comment information can be displayed on the target comment page. Here, the target comment page can be a floating window or a page embedded in the book encyclopedia page.

In the case of a floating window, after a user's triggering operation on the comment tag is detected, a floating window with a scroll bar can be displayed in an upper portion of the page of the book encyclopedia page, and the target comment information can be displayed in the floating window.

In the case of an embedded comment page, after a user's triggering operation on the comment tag is detected, the embedded comment page is displayed in the book encyclopedia page, and target comment information is displayed on the embedded comment page.

In the embodiment of the present disclosure, the target comment information may include at least one of the following: historical comment information, comment interaction information of historical comment information and comment input box, wherein, the historical comment information can be understood as the comment information of other users on the book encyclopedia information at historical moments; the comment interaction information of historical comment information can be understood as the comment information of historical comment information, the number of likes of historical comment information and the number of likes of comment information of the historical comment information.

For example, as shown in FIG. 3, for the "Author" module, a comment tag is set, which can be used to display the number of existing comments, for example, 34 comments. After the user clicks on a comment tag in front of the "34 comments", he/she can enter the target comment page. The target comment page can include all or part of the "34 comments". For example, the top X comments with the highest popularity can be displayed, or the top Y comments with the earliest comment time can be displayed. The target comment page can also include a comment input box, in which the user can input the corresponding comment information and publish the comment information after a confirmation operation is detected.

In the above embodiment, by setting a comment tag for each information module, communication and interaction between users can be realized, thus improving the interactive interestingness of the book encyclopedia pages.

In an alternative embodiment, the method further comprises steps of the following:

Step S41: displaying a contribution tag of the information module on the book encyclopedia page;

Step S42: displaying a target contribution page in response to a triggering operation on the contribution tag;

Step S43: acquiring contribution information of the information module, in response to an editing operation on the contribution input box in the target contribution page, so as to update book encyclopedia information of the corresponding information module according to the contribution information. Here, for each information module, an editing portal can also be set, wherein the user can view historical contribution information of the book encyclopedia information about the information module through the editing portal.

Here, the user can enter the target contribution page through the editing portal, which target contribution page includes historical contribution information of other users about the information module, and which target contribution page can also include a contribution input box, through which the user can input contribution information for the information module.

In the actual implementation, a contribution tag can be set for the information module, displayed on the book encyclopedia page, and determined as an editing portal.

After a trigger operation of the contribution tag is detected, a target contribution page can be displayed in the book encyclopedia page, wherein the target contribution page can be a floating window or a page embedded in the book encyclopedia page.

After the target contribution page is displayed, a user's editing operation on the contribution input box in the target contribution page can be detected, and user's contribution information to the information module can be received, and then the contribution information can be updated as the book encyclopedia information of the information module.

Here, for any information module, if multiple users edit contribution information for the information module, book encyclopedia information can be determined among the multiple contribution information according to voting information or the number of likes for each contribution information. For example, the contribution information with the highest number of votes or the highest number of likes can be displayed as the book encyclopedia information of the information module.

In the above embodiment, by setting the contribution tag, the user can be provided with an interactive portal, thus realizing the interaction between the user and the book encyclopedia page.

In an alternative embodiment, the function tag includes: at least one directory tag and a switch tag, each said information module corresponding to one said directory tag, and the switch tag is a tag for switching the information modules displayed in the content display area.

Here, the switch tag is the "directory" tag shown in FIG. 3, and the directory tag includes the following tags: introduction of works, author, world outlook, major characters and so on. As shown in FIG. 3, each information module is provided correspondingly with a directory tag, and each target tag can include at least one sub-tag.

In this case, after displaying a function tag of a target information module of the plurality of information modules in a directory display area of the book encyclopedia page, the method further includes steps of the following:

Step S51: displaying a directory intermediate page in response to a trigger operation on the switch tag, wherein, the target intermediate page comprises a directory tag corresponding to each information module and at least one sub-tab of each said directory tag;

Step S52: in response to a trigger operation on a first tag in the directory intermediate page, jumping to displaying the book encyclopedia page, and displaying book encyclopedia information corresponding to the first tag in the content display area of the book encyclopedia page, wherein the first tag comprises a directory tag or a sub-tag of the directory tag.

In the embodiment of the present disclosure, a user's trigger operation on the "directory" tag (i.e., the switch tag) shown in FIG. 3 can be detected, and after the trigger operation is detected, a directory intermediate page can be displayed, wherein the directory intermediate page can be an intermediate page shown in FIG. 4.

As shown in FIG. 4, the directory intermediate page includes a directory tag corresponding to each information module, for example, the following directory tags are included: author, world outlook, major characters, noun interpretation, wonderful sayings, memorabilia and so on.

Here, for each directory tag, there may be at least one sub-tag. Here, at least one sub-tag of the directory tag can be displayed in the directory intermediate page. For example, the directory tag "World Outlook" includes sub-tabs "Story Background" and "Core Power". Here, the at least one sub-tag can be displayed at a position corresponding to the directory tag in the directory intermediate page. After the directory intermediate page is displayed, a user's triggering operation on the directory tag or sub-tab in the directory intermediate page can be detected. After detecting the trigger operation on the directory tag or sub-tab (i.e. the first tag) in the directory intermediate page, it is possible to jump to displaying the book encyclopedia page, and displaying book encyclopedia information corresponding to the first tag in the content display area of the book encyclopedia page. Here, book encyclopedia information corresponding to the first tag can be displayed the earliest at the bottom area of the directory display area. Then, in another area of the content display area, book encyclopedia information corresponding to other directory tags located behind the first tag in the function tag is displayed.

In the above embodiment, page layout of the book encyclopedia page can be displayed more intuitively for the user by setting a directory intermediate page and according to the manner of displaying the directory tag and switch tag by the directory intermediate page, thus facilitating the user to search the content he/she wants to know more quickly.

In an alternative embodiment, the method provided by the embodiment of the present disclosure further comprises steps of the following:

> Step S61: in response to a new operation on the information module, a functional new page is displayed, wherein the functional new page includes at least one alternative function;
>
> Step S62: in response to a triggering operation on a target alternative function in the at least one alternative function, creating an editing area of the target alternative function in the book encyclopedia page;
>
> Step S63: determining book encyclopedia information of the target alternative function based on editing information of the editing area.

In the embodiment of the present disclosure, a new portal of an information module can also be set on the book encyclopedia page, wherein a user can add an information module to the book encyclopedia page through the new portal, such that the user can edit book encyclopedia information on the newly-added information module.

In the actual implementation, an operation for newly creating an information module can be detected, and after the operation is detected, the functional new page can be displayed, and at least one alternative function can be displayed in the functional new page. Wherein, book attribute dimensions corresponding to alternative functions are different, and alternative functions and book attribute dimensions corresponding to the created information modules are also different. Here, a plurality of alternative templates can be preset for the user. Here, the user can select a newly-added information module from the alternative templates, wherein each alternative module can include information such as the category and name of the alternative module and sub-modules included in the alternative module. Besides, it is also supported that the user creates a new information module by himself/herself. For example, the user can set by himself/herself for the alternative module such information as category, name, the number of sub-modules, and category and name of each sub-module, etc.

After detecting a trigger operation on a target alternative function in the functional new page, an editing area of the target alternative function can be created in the book encyclopedia page. Here, the editing area can be determined in the book encyclopedia page according to functional attribute of the target alternative function, for example, the editing area can be a position that matches the target alternative function such as top of the book encyclopedia page, or bottom of the book encyclopedia page.

In the actual implementation, modular relationship between each alternative function and each created information module can be preset, wherein the modular relationship is used to indicate a display order of the alternative function and each information module in the book encyclo-pedia page. Thereafter, the editing area can be determined in the book encyclopedia page based on the modular relationship.

Next, editing information of the editing area can be received, such that the editing information can be determined as the book encyclopedia information of the target alternative function.

In the above embodiment, new function of an information module can be set, which can provide the user with a window for information optimization of the book encyclopedia information, thus making it more convenient for the user to obtain the main information of the book, improving the retrieval efficiency of the book by the user, and enabling the user to locate the book he/she wants to read more quickly.

It can be understood by those skilled in the art that in the above-mentioned method of specific embodiment, the writing order of individual steps does not mean strict implementation order and constitutes any limitation on the implementation process, and the specific implementation order of individual steps should be determined according to function and possible internal logic.

Based on the same inventive concept, the embodiment of the present disclosure also provides an information display device corresponding to the information display method. Since the principle of solving problem by the device in the embodiment of the present disclosure is similar to the above-mentioned information display method in the embodiment of the present disclosure, the implementation of the device can refer to the implementation of the method, and will not be repeated here.

Referring to FIG. 5, it shows a schematic diagram of an information display device provided by an embodiment of the present disclosure, the device including a receiving unit 10, an acquiring unit 20, and a display unit 30, wherein, > the receiving unit is for receiving an access request for book encyclopedia information of a target book;
>
> the acquiring unit is for acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original innovative information and/or information obtained by automatically identifying book-related content of the target book;
>
> the display unit is for acquiring and displaying a book encyclopedia page matched with book category of the target book, and displaying the book encyclopedia information of each information module on the book encyclopedia page.

In the above embodiment, by setting book encyclopedia information for the target book, information of each book attribute dimension to which the target book belongs can be aggregated. By displaying the book encyclopedia information of the target book through the book encyclopedia page, various book encyclopedia information of the target book can be displayed for the user through more aggregated display, such that the user can get to know the target book more quickly, thereby improving the user's screening efficiency of books and further improving the user's retrieval efficiency.

In a possible embodiment, the device is further configured to determine the book encyclopedia information by: extracting the content that matches with the book attribute dimension of each information module from the book-related content of the target book to obtain at least one candidate encyclopedia information; determining the book encyclopedia information based on the at least one candidate encyclopedia information.

In a possible embodiment, the device is further configured for determining a selected target candidate encyclopedia information in response to a selection operation of the at least one candidate encyclopedia information, and displaying the target candidate encyclopedia information; determining an edited target candidate encyclopedia information in response to an editing operation of the target candidate encyclopedia information, and determining the book encyclopedia information based on the edited target candidate encyclopedia information.

In a possible embodiment, the display unit is further configured for displaying a function tag of a target information module in the plurality of information modules in a directory display area of the book encyclopedia page, wherein the target information module is at least part of the plurality of information modules; displaying the book encyclopedia information of the target information module in a content display area of the book encyclopedia page, wherein the content display area is located below the directory display area.

In a possible embodiment, the device is further configured for displaying a comment tag of the information module on the book encyclopedia page; in response to a triggering operation of the comment tag, displaying a target comment page, and displaying target comment information on the target comment page, wherein, the target comment information includes at least one of the following: historical comment information of the information module, comment interaction information of the historical comment information, and a comment input box.

In a possible embodiment, the device is further configured for displaying a contribution tag of the information module on the book encyclopedia page; displaying a target contribution page in response to a triggering operation of the contribution tag; acquiring contribution information of the information module, in response to an editing operation of the contribution input box in the target contribution page, so as to update book encyclopedia information of the corresponding information module according to the contribution information.

In a possible embodiment, the function tag includes at least one directory tag and a switch tag, wherein each information module corresponds to one directory tag, and the switch tag is a tag for switching information modules displayed in the content display area; the device is further configured for: after displaying the functional tag of the target information module of the plurality of information modules in the directory display area of the book encyclopedia page, displaying a directory intermediate page in response to a trigger operation of the switch tag, wherein, the directory intermediate page comprises a directory tag corresponding to each said information module and at least one sub-tag of each said directory tag; in response to a trigger operation of a first tag in the directory intermediate page, jumping to displaying the book encyclopedia page, and displaying book encyclopedia information corresponding to the first tag in the content display area of the book encyclopedia page, wherein the first tag comprises a directory tag or a sub-tag of the directory tag.

In a possible embodiment, the device is further configured for: displaying a functional new page in response to a new operation of the information module, wherein the functional new page includes at least one alternative function; in response to a triggering operation on a target alternative function in the at least one alternative function, creating an editing area of the target alternative function in the book encyclopedia page; determining book encyclopedia information of the target alternative function based on editing information of the editing area. For the processing flow of individual units in the device and interaction flow between individual units, one may refer to the relevant recitation in the above method embodiments, and will not be described in detail here.

Embodiment 2

Figure 6:
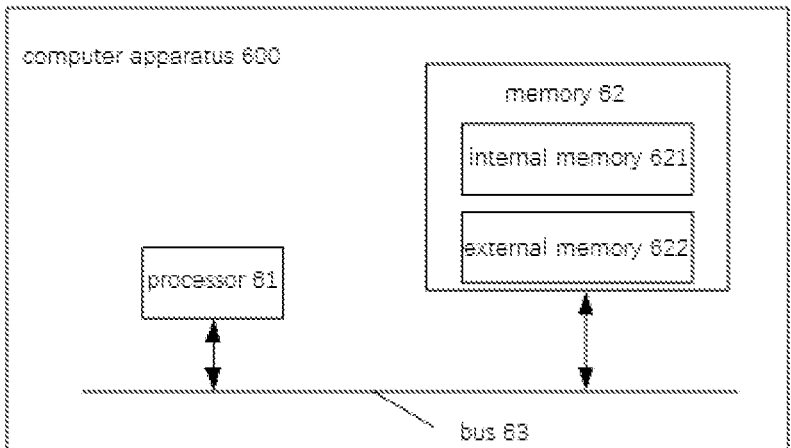
FIG. 6 is a schematic diagram of a computer apparatus provided by an embodiment of the present disclosure.

Corresponding to the information display method as shown in FIG. 1, the embodiment of the present disclosure also provides a computer apparatus 600. As shown in FIG. 6, it shows a structural schematic diagram of the computer apparatus 600 provided by the embodiment of the present disclosure, the apparatus including:

a processor 61, a memory 62, and a bus 63, wherein the memory 62 is configured for storing execution instructions and includes an internal memory 621 and an external memory 622, wherein the internal memory 621 is also called an internal storage that is configured to temporarily store operation data of the processor 61 and data to be exchanged with the external memory 622 such as a hard disk, wherein the processor 61 exchanges data with the external memory 622 through the internal memory 621, wherein, when the computer apparatus 600 operates, the processor 61 communicates with the memory 62 through the bus 63, such that the processor 61 executes the following instructions:

receiving an access request for book encyclopedia information of a target book;

acquiring the book encyclopedia information of the target book, wherein, the book encyclopedia information comprises a plurality of information modules, each information module corresponding to at least one book attribute dimension, and the book encyclopedia information belonging to each book attribute dimension is determined according to user's original innovative information and/or information obtained by automatically identifying book-related content of the target book;

acquiring and displaying a book encyclopedia page matched with book category of the target book, and displaying the book encyclopedia information of each information module on the book encyclopedia page.

Embodiment 3

The embodiment of the present disclosure further provides a computer-readable storage medium, on which a computer program is stored, and the computer program, when executed by the processor, implements steps of the information display method in the above method embodiment. Wherein the storage medium can be a volatile or nonvolatile computer-readable storage medium.

The embodiment of the present disclosure also provides a computer program product, which carries a program code, and the program code includes instructions that can be used to execute the steps of the information display method recited in the above-mentioned method embodiment. For details, one may refer to the above-mentioned method embodiment, which is not repeated here.

Wherein, the above computer program product can be realized by hardware, software or the combination thereof.

In an alternative embodiment, the computer program product is embodied as a computer storage medium, and in another alternative embodiment, the computer program product is embodied as a software product, such as a Software Development Kit (SDK) or the like.

It can be clearly understood by those skilled in the art that for the convenience and conciseness of description, the specific working process of the system, device and apparatus described above can refer to the corresponding process in the aforementioned method embodiment, and will not be repeated here. In several embodiments provided by the present disclosure, it should be understood that the disclosed system, device, apparatus and method can be realized in other manners. The device/apparatus embodiments described above are only schematic. For example, the division of the units is only a logical function division, and there may be another division method in actual implementation. For example, multiple units or components may be combined or integrated into another system, or some features may be ignored or not implemented. On the other hand, the mutual coupling or direct coupling or communicative connection shown or discussed can be indirect coupling or communicative connection through some communicative interfaces, devices or units, which can be in electrical, mechanical or any other form.

Units described as separate components may or may not be physically separated, and components displayed as units may or may not be physical units, that is, they may be located in one place or distributed to multiple network units. Some or all of the units can be selected according to actual needs to achieve the purpose of this embodiment.

In addition, individual functional units in each embodiment of the present disclosure may be integrated into one processing unit, or individual units may exist physically alone, or two or more units may be integrated into one unit.

If the function is realized in the form of a software functional unit and sold or used as an independent product, it can be stored in a processor-executable nonvolatile computer-readable storage medium. Based on this understanding, the technical solution of the present disclosure essentially or the part contributing to the state of art or part of the technical solution can be embodied in the form of a software product, which is stored in a storage medium and includes several instructions configured to cause a computer apparatus (which can be a personal computer, a server, a network device, etc.) to execute all or part of the steps of the method described in various embodiments of the present disclosure. The aforementioned storage media include USB flash disk, mobile hard disk, Read-Only Memory (ROM), Random Access Memory (RAM), magnetic disk or optical disk and other media that can store program codes.

Finally, it should be noted that the above-mentioned embodiments are only specific embodiments of the present disclosure, which are used to describe the technical solution of the present disclosure, but not to limit it. Although a detailed description is given to the present disclosure with reference to preferred embodiments, a person skilled in the art should understand that, any technical person familiar with the technical field can still modify the technical solution described in the above embodiment or easily anticipate of varying, or replacing some technical features with equivalents within the technical scope disclosed in the present disclosure. However, these modifications, variations or replacements do not cause the essence of the corresponding technical solution to deviate from the spirit and scope of the technical solution of the embodiment of the present disclosure, and should be included in the protection scope of the present disclosure. Therefore, the scope of protection of the present disclosure should be based on the scope of protection of the claims.

What is claimed is:

1. An information display method, comprising:

receiving an access request for book encyclopedia information of a target book;

acquiring the book encyclopedia information of the target book, wherein, the book encyclopedia information comprises a plurality of information modules, each information module corresponding to at least one book attribute dimension, and the book encyclopedia information belonging to each book attribute dimension is determined according to at least one of user's original innovative information or information obtained by automatically identifying book-related content of the target book;

acquiring and displaying a book encyclopedia page matching book category of the target book, and displaying the book encyclopedia information of each information module on the book encyclopedia page;

wherein the displaying the book encyclopedia information of each information module on the book encyclopedia page comprises:

displaying a function tag of a target information module of the plurality of information modules in a directory display area of the book encyclopedia page, wherein the target information module is at least part of the plurality of information modules, wherein the function tag comprises: at least one directory tag and a switch tag, each said information module corresponding to one directory tag, and the switch tag is a tag for switching the information modules displayed in the content display area, and the at least one directory tag is displayed along with the switch tag in the directory display area of the book encyclopedia page;

causing the book encyclopedia page to display a directory intermediate page in response to a trigger operation on the switch tag displayed along with the at least one directory tag in the directory display area of the book encyclopedia page, wherein the directory intermediate page comprises a directory tag corresponding to each information module and at least one sub-tab of each said directory tag; and in response to a trigger operation on a first tag in the directory intermediate page, jumping to displaying the book encyclopedia page, and displaying book encyclopedia information corresponding to the first tag in the content display area of the book encyclopedia page, wherein the first tag comprises a directory tag or a sub-tag of the directory tag.

2. The method according to claim 1, wherein the book encyclopedia information is determined by:

extracting content that matches with a book attribute dimension of each information module from the book-related content of the target book to obtain at least one candidate encyclopedia information;

determining the book encyclopedia information based on the at least one candidate encyclopedia information.

3. The method according to claim 2, wherein the determining the book encyclopedia information based on the at least one candidate encyclopedia information comprises:

in response to a selection operation of the at least one candidate encyclopedia information, determining the selected target candidate encyclopedia information and displaying the target candidate encyclopedia information;

determining an edited target candidate encyclopedia information in response to an editing operation on the target candidate encyclopedia information, and determining the book encyclopedia information based on the edited target candidate encyclopedia information.

4. The method according to claim 1, wherein the displaying the book encyclopedia information of each information module in the book encyclopedia page comprises:

displaying the book encyclopedia information of the target information module in a content display area of the book encyclopedia page, wherein the content display area is located below the directory display area.

5. The method according to claim 4, further comprising:

displaying a comment tag of the information module on the book encyclopedia page;

in response to a triggering operation of the comment tag, displaying a target comment page, and displaying target comment information on the target comment page, wherein, the target comment information includes at least one of the following: historical comment information of the information module, comment interaction information of the historical comment information or a comment input box.

6. The method according to claim 4, further comprising:

displaying a contribution tag of the information module on the book encyclopedia page;

displaying a target contribution page in response to a triggering operation on the contribution tag;

acquiring contribution information of the information module, in response to an editing operation on the contribution input box in the target contribution page, so as to update book encyclopedia information of the corresponding information module according to the contribution information.

7. The method according to claim 1, further comprising:

in response to a new operation on the information module, displaying a functional new page, wherein the functional new page comprises at least one alternative function;

in response to a triggering operation on a target alternative function in the at least one alternative function, creating an editing area of the target alternative function in the book encyclopedia page;

determining book encyclopedia information of the target alternative function based on editing information of the editing area.

8. A computer apparatus, comprising:

a processor, and a memory coupled to the processor, wherein the memory is configured to store machine-readable instructions executable by the processor, and the machine-readable instructions, when executed by the processor, cause the processor to:

receive an access request for book encyclopedia information of a target book;

acquire the book encyclopedia information of the target book, wherein, the book encyclopedia information comprises a plurality of information modules, each information module corresponding to at least one book attribute dimension, and the book encyclopedia information belonging to each book attribute dimension is determined according to at least one of user's original innovative information or information obtained by automatically identifying book-related content of the target book;

acquire and display a book encyclopedia page matching book category of the target book, and display the book encyclopedia information of each information module on the book encyclopedia page;

wherein the machine-readable instructions for displaying the book encyclopedia information of each information module on the book encyclopedia page further cause the process to:

display a function tag of a target information module of the plurality of information modules in a directory display area of the book encyclopedia page, wherein the target information module is at least part of the plurality of information modules, wherein the function tag comprises: at least one directory tag and a switch tag, each said information module corresponding to one directory tag, and the switch tag is a tag for switching the information modules displayed in the content display area, and the at least one directory tag is displayed along with the switch tag in the directory display area of the book encyclopedia page;

cause the book encyclopedia page to display a directory intermediate page in response to a trigger operation on the switch tag displayed along with the at least one directory tag in the directory display area of the book encyclopedia page, wherein the directory intermediate page comprises a directory tag corresponding to each information module and at least one sub-tab of each said directory tag; and in response to a trigger operation on a first tag in the directory intermediate page, jump to displaying the book encyclopedia page, and display book encyclopedia information corresponding to the first tag in the content display area of the book encyclopedia page, wherein the first tag comprises a directory tag or a sub-tag of the directory tag.

9. The computer apparatus according to claim 8, wherein the book encyclopedia information is determined by:

extracting content that matches with a book attribute dimension of each information module from the book-related content of the target book to obtain at least one candidate encyclopedia information;

determining the book encyclopedia information based on the at least one candidate encyclopedia information.

10. The computer apparatus according to claim 9, wherein the machine-readable instructions for determining the book encyclopedia information based on the at least one candidate encyclopedia information further cause the process to:

in response to a selection operation of the at least one candidate encyclopedia information, determine the selected target candidate encyclopedia information and displaying the target candidate encyclopedia information;

determine an edited target candidate encyclopedia information in response to an editing operation on the target candidate encyclopedia information, and determine the book encyclopedia information based on the edited target candidate encyclopedia information.

11. The computer apparatus according to claim 8, wherein the machine-readable instructions for displaying the book encyclopedia information of each information module in the book encyclopedia page further cause the processor to:

display a function tag of a target information module of the plurality of information modules in a directory display area of the book encyclopedia page, wherein the target information module is at least part of the plurality of information modules;

display the book encyclopedia information of the target information module in a content display area of the book encyclopedia page, wherein the content display area is located below the directory display area.

12. The computer apparatus according to claim 11, further comprising machine-readable instructions, when executed by the processor, cause the processor to:

display a comment tag of the information module on the book encyclopedia page;

in response to a triggering operation of the comment tag, display a target comment page, and display target comment information on the target comment page, wherein, the target comment information includes at least one of the following: historical comment information of the information module, comment interaction information of the historical comment information or a comment input box.

13. The computer apparatus according to claim 11, further comprising machine-readable instructions, when executed by the processor, cause the processor to:

display a contribution tag of the information module on the book encyclopedia page;

display a target contribution page in response to a triggering operation on the contribution tag;

acquire contribution information of the information module, in response to an editing operation on the contribution input box in the target contribution page, so as to update book encyclopedia information of the corresponding information module according to the contribution information.

14. The computer apparatus according to claim 11, wherein the function tag comprises: at least one directory tag and a switch tag, each said information module corresponding to one directory tag, and the switch tag is a tag for switching the information modules displayed in the content display area;

after displaying a function tag of a target information module of the plurality of information modules in a directory display area of the book encyclopedia page, further comprising machine-readable instructions, when executed by the processor, cause the processor to:

display a directory intermediate page in response to a trigger operation on the switch tag, wherein, the target intermediate page comprises a directory tag corresponding to each information module and at least one sub-tab of each said directory tag;

in response to a trigger operation on a first tag in the directory intermediate page, jump to displaying the book encyclopedia page, and display book encyclopedia information corresponding to the first tag in the content display area of the book encyclopedia page, wherein the first tag comprises a directory tag or a sub-tag of the directory tag.

15. The computer apparatus according to claim 8, further comprising machine-readable instructions, when executed by the processor, cause the processor to:

in response to a new operation on the information module, display a functional new page, wherein the functional new page comprises at least one alternative function;

in response to a triggering operation on a target alternative function in the at least one alternative function, create an editing area of the target alternative function in the book encyclopedia page;

determine book encyclopedia information of the target alternative function based on editing information of the editing area.

16. A non-transitory computer-readable storage medium having a computer program stored thereon, the computer program, when executed by the processor, causes the processor to:

receive an access request for book encyclopedia information of a target book;

acquire the book encyclopedia information of the target book, wherein, the book encyclopedia information comprises a plurality of information modules, each information module corresponding to at least one book attribute dimension, and the book encyclopedia information belonging to each book attribute dimension is determined according to at least one of user's original innovative information or information obtained by automatically identifying book-related content of the target book;

acquire and display a book encyclopedia page matching book category of the target book, and display the book encyclopedia information of each information module on the book encyclopedia page;

wherein the computer program for displaying the book encyclopedia information of each information module on the book encyclopedia page further causes the process to:

display a function tag of a target information module of the plurality of information modules in a directory display area of the book encyclopedia page, wherein the target information module is at least part of the plurality of information modules, wherein the function tag comprises: at least one directory tag and a switch tag, each said information module corresponding to one directory tag, and the switch tag is a tag for switching the information modules displayed in the content display area, and the at least one directory tag is displayed along with the switch tag in the directory display area of the book encyclopedia page;

cause the book encyclopedia page to display a directory intermediate page in response to a trigger operation on the switch tag displayed along with the at least one directory tag in the directory display area of the book encyclopedia page, wherein the directory intermediate page comprises a directory tag corresponding to each information module and at least one sub-tab of each said directory tag; and in response to a trigger operation on a first tag in the directory intermediate page, jump to displaying the book encyclopedia page, and display book encyclopedia information corresponding to the first tag in the content display area of the book encyclopedia page, wherein the first tag comprises a directory tag or a sub-tag of the directory tag.

17. The non-transitory computer-readable storage medium according to claim 16, wherein the book encyclopedia information is determined by:

extracting content that matches with a book attribute dimension of each information module from the book-related content of the target book to obtain at least one candidate encyclopedia information;

determining the book encyclopedia information based on the at least one candidate encyclopedia information.

18. The non-transitory computer-readable storage medium according to claim 17, wherein the computer program for determining the book encyclopedia information based on the at least one candidate encyclopedia information further causes the processor to:

in response to a selection operation of the at least one candidate encyclopedia information, determine the selected target candidate encyclopedia information and displaying the target candidate encyclopedia information;

determine an edited target candidate encyclopedia information in response to an editing operation on the target candidate encyclopedia information, and determine the book encyclopedia information based on the edited target candidate encyclopedia information.

19. The non-transitory computer-readable storage medium according to claim 16, wherein the computer program for displaying the book encyclopedia information of each information module in the book encyclopedia page further causes the processor to:

display a function tag of a target information module of the plurality of information modules in a directory display area of the book encyclopedia page, wherein the target information module is at least part of the plurality of information modules;

display the book encyclopedia information of the target information module in a content display area of the book encyclopedia page, wherein the content display area is located below the directory display area.

* * * * *